US 6,585,809 B1

(12) United States Patent  
Parsa

(10) Patent No.: US 6,585,809 B1  
(45) Date of Patent: Jul. 1, 2003

(54) CONTINUOUS GAS SEPARATION IN AN OPEN SYSTEM

(76) Inventor: Komad Parsa, 29882 Sean Dr., Laguna Niguel, CA (US) 92677

( * ) Notice: Subject to any disclaimer, the term of this patent is extended or adjusted under 35 U.S.C. 154(b) by 0 days.

(21) Appl. No.: 10/194,628

(22) Filed: Jul. 12, 2002

(51) Int. Cl.[7] ............................................. B03C 3/016
(52) U.S. Cl. ...................... 96/16; 95/78; 96/63; 96/66; 96/224
(58) Field of Search ............... 96/63, 64, 66, 96/67, 96, 7, 8, 10, 16, 224

(56) References Cited

U.S. PATENT DOCUMENTS

| | | | |
|---|---|---|---|
| 3,154,682 A | * 10/1964 | Hartz et al. ................... 95/78 |
| 3,826,063 A | * 7/1974 | Festner ............................ 96/73 |
| 4,231,766 A | 11/1980 | Spurgin ................... 361/230 X |
| 4,319,979 A | 3/1982 | King ............................. 204/302 |
| 4,422,824 A | * 12/1983 | Eisenhardt, Jr. ............... 416/5 |
| 4,919,690 A | * 4/1990 | Lovelock ......................... 95/78 |
| 5,097,665 A | * 3/1992 | Kammel ......................... 60/275 |
| 5,450,822 A | 9/1995 | Cunningham ........... 204/272 X |
| 5,540,761 A | * 7/1996 | Yamamoto ..................... 96/67 |
| 5,855,652 A | * 1/1999 | Talley ............................ 96/44 |
| 5,868,918 A | 2/1999 | Adler et al. ................. 205/615 |
| 5,913,809 A | 6/1999 | Erlichman et al. ........ 60/275 X |
| 5,942,026 A | 8/1999 | Erlichman et al. .......... 96/66 X |
| 5,961,693 A | * 10/1999 | Altman et al. .................. 95/78 |
| 5,972,077 A | 10/1999 | Judkins et al. ................ 95/136 |
| 5,992,397 A | 11/1999 | Hideaki et al. ............. 123/538 |
| 6,302,944 B1 | 10/2001 | Hoenig ....................... 96/66 X |
| 6,375,714 B1 | 4/2002 | Rump et al. ................. 96/96 X |

OTHER PUBLICATIONS

"Applications Of Air Ionization For Control Of VOCs And PM" by Dr. Stacy L. Daniels, Director of Research, Precision Air, A Division Of Quality Air Of Midland, Inc. Paper #918 (Session AB–7a: Advances in, and Evaluation of, IAQ Control; pp. 1–16, Undated.

* cited by examiner

Primary Examiner—Richard L. Chiesa  
(74) Attorney, Agent, or Firm—O'Melveny & Myers LLP

(57) ABSTRACT

A system for separating a gaseous constituent from a gaseous mixture includes an ionization chamber, suction plenums separated from the chamber by an anode or a cathode, suction pumps for drawing gas from the plenums, and a throttle valve for controlling the entry of gas into the ionization chamber so as to maintain the chamber at a pressure less than atmospheric. The ionization chamber is bounded by an anode and a cathode, which are separated by a volume for containing the gaseous mixture. When the electrodes are oppositely charged, ions of a gaseous constituent are drawn towards the electrode of opposite polarity to the ions, and away from the other electrode. As ions approach the electrodes, they are collected and sucked though exhaust ports by the pumps.

17 Claims, 2 Drawing Sheets ature. Each of the oppositely charged electrodes faces the enclosed volume. The electrodes may be generally planar or sheet-like, with a primary surface of relatively large area. In the alternative, the electrodes may be configured as wire or needle arrays. Each electrode has a second surface facing an exhaust plenum, and generally divides the enclosed volume between the electrodes from a separate exhaust plenum. By arrangement of the electrodes, the ionization chamber comprises at least one enclosed volume bounded by at least two oppositely-charged electrodes, and at least two exhaust plenums, each bounded by a single electrode. Each electrode further comprises at least one passageway connecting the enclosed volume between the electrodes to the exhaust plenum on the opposite side of the electrode, to permit gas to flow through or around the electrode. The ionization chamber, including the volume between the electrodes and the two exhaust plenums, may also be bounded by non-electrode surfaces that may be either non-conductive or conductive. If other boundary surfaces are conductive, they are insulated from the electrodes.

CONTINUOUS GAS SEPARATION IN AN OPEN SYSTEM

BACKGROUND OF THE INVENTION

1. Field of the Invention

The present invention relates to a method and system for separation of gas mixtures into gas volumes having higher concentrations of selected constituent gases, and particularly to such methods and systems as operate at relatively low pressures, such as partial atmospheric pressure, or less.

2. Description of Related Art

It is generally desirable, for a variety of applications, to separate constituent gases of a gaseous mixture. For example, the constituent gases of oxygen, nitrogen, carbon dioxide, argon, etc., are often separated from air, using numerous different methods. Methods for such separation often entail the use of massive and/or complex equipment, and consume a large amount of energy. Consequently, bottled gas (pressurized or liquefied) is predominantly used for applications in which a relatively pure gas is required. Except for a few specialized industrial processes, continuous, on-demand gas separation methods that use ambient air as a feedstock are generally too expensive and/or not technically feasible for many applications in which gaseous separation may be beneficial.

For example, for combustion engine applications, it may be beneficial to enrich intake air with oxygen, to enable increased power or efficiency. Presently, there is no effective solution for providing oxygen in a continuous process using air as a feedstock, that is feasible for use with gasoline or diesel engines in transportation applications. Similar benefits might be realized with other mobile or stationary power plants or combustion applications. Separation of more concentrated oxygen and/or nitrogen streams from ambient air may also be useful for various different industrial processes, for fire prevention or suppression, for air conditioning or medical purposes, and/or other applications.

It is desirable, therefore, to provide a system and method for separating, at least in part, constituents of a gaseous mixture. The system and method should be capable of separating the primary constituents of ambient air (i.e., oxygen and nitrogen) using relatively light-weight equipment that is economical and relatively maintenance-free. The equipment should be useful for diverse applications, for example, for use with diesel or gasoline engines in trucking, marine, or automotive applications, or for any other application where a continuous gas stream that is at least partially enriched in oxygen or nitrogen is desired.

SUMMARY OF THE INVENTION

The invention provides a method and system for separating constituents of gas mixtures, that is suitable for separating oxygen, nitrogen, and perhaps other constituents, from ambient air in a continuous process. The method may be implemented using lightweight, relatively inexpensive equipment that may be configured for a variety of different applications and operating environments. The invention is therefore believed suitable for use with variety of different applications for which continuous, on-demand gas separation was previously not feasible.

According to a method of the invention, a gas mixture is continuously introduced into an ionization chamber. The ionization chamber comprises oppositely-charged electrodes separated by an enclosed volume that is filled with the gas mixture. Each of the oppositely charged electrodes faces the enclosed volume. The electrodes may be generally planar or sheet-like, with a primary surface of relatively large area. In the alternative, the electrodes may be configured as wire or needle arrays. Each electrode has a second surface facing an exhaust plenum, and generally divides the enclosed volume between the electrodes from a separate exhaust plenum. By arrangement of the electrodes, the ionization chamber comprises at least one enclosed volume bounded by at least two oppositely-charged electrodes, and at least two exhaust plenums, each bounded by a single electrode. Each electrode further comprises at least one passageway connecting the enclosed volume between the electrodes to the exhaust plenum on the opposite side of the electrode, to permit gas to flow through or around the electrode. The ionization chamber, including the volume between the electrodes and the two exhaust plenums, may also be bounded by non-electrode surfaces that may be either non-conductive or conductive. If other boundary surfaces are conductive, they are insulated from the electrodes.

Each exhaust plenum is connected to an exhaust port through which an exhaust gas stream is drawn at a controlled rate. The gas mixture in the volume between the electrodes is maintained at a controlled pressure that is generally less than atmospheric pressure, for example, a low vacuum pressure. In an embodiment of the invention, gas pressure is maintained by adjusting a gas input valve connected to the volume between the electrodes, depending on the exhaust rate. By throttling the input valve while pumping gas out the exhaust port, a continuous flow of low-pressure gas can be drawn through the volume between the electrodes and out the separate exhaust ports.

The electrodes are connected to opposite terminals of a DC voltage source, thereby establishing a static electric field between the plates. Electrode voltage should be selected to promote ionization of the gas mixture in the input space, while avoiding generation of any unwanted ion species. Optimum voltage will depend on parameters such as the chemistry of the gas mixture; spacing, shape, and composition of the electrodes, and gas flow rate. In general, higher gas pressures may facilitate higher mass flow rates, while requiring higher electrode voltage. If gas pressure is too high, however, separation of different ionic species may be impaired.

The electric field between the electrodes may cause a portion of the gas in the input space to become ionized. In an embodiment of the invention, the rate of ionization is increased by exposing the gas in the input space to ionizing radiation, such as from an ultraviolet lamp or other radiation source. In another embodiment, the electrodes may by themselves provide adequate ionization, without a further radiation source.

Separation of the gas species from the mixture proceeds as the gaseous mixture between the electrodes is ionized. In many gas mixtures, different gas species of the mixture will possess a greater affinity for electrons than other species of the mixture. Hence, when the gas mixture is ionized, the negative ions will be made up of a proportionally greater number of the gas species having a higher electron affinity, depending on factors such as the electric field strength, the type of gas, and the density of the gas. For example, in a mixture of oxygen and nitrogen, oxygen has a greater affinity for electrons, so under certain conditions, a greater proportion of the negative ions will be oxygen, relative to the proportion of oxygen in air. Conversely, more of the positive ions will be nitrogen. Creation of negative $O_2$ ions and positive $N_2$ ions may predominate when the electric field is less than required to produce an arc discharge. For example, at atmospheric pressure, less than about 20,000 Volts per cm.

The oppositely charged electrodes define opposite surfaces of the input space, and so the negative ions may propagate towards the positive electrode, and the positive ions may propagate towards the negative electrode. As the ions propagate towards their respective electrodes, they are drawn through the electrode passageways and into the exhaust space by suction applied through the exhaust port. In the process, the charged ions may be essentially neutralized by the oppositely charged electrode through which they are being drawn. The gas in the exhaust space, now enriched in a desired gas species relative to the mixture, is then drawn out the exhaust port for use in the intended application. For greater enrichment, two or more ionization chambers as described may be placed in series, with the exhaust gas from one chamber fed into the entry port of a second chamber in the series.

A more complete understanding of the method and system for gas separation will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

Figure 1:
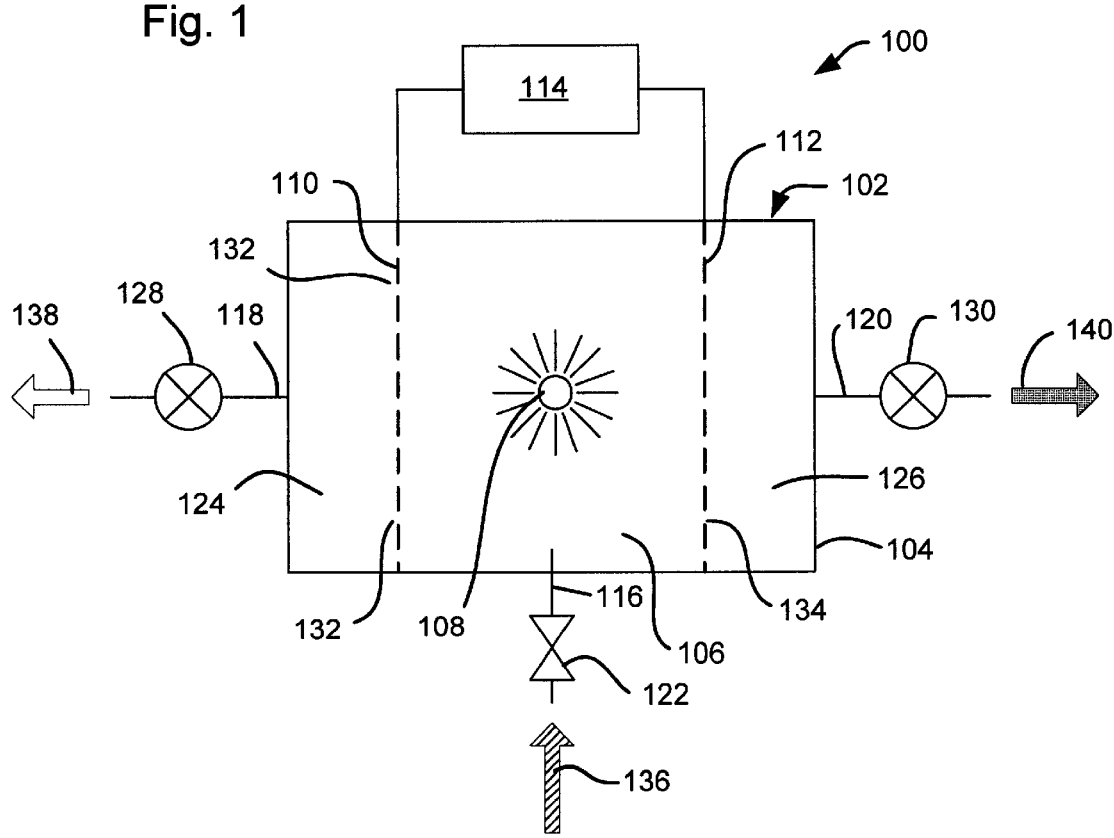
FIG. 1 is a diagram showing an exemplary system for gas separation.

The present invention provides a method and system for separation of a constituent from a gaseous mixture. FIG. 1 shows a system 100 according to the invention. System 100 and its elements are shown in a simplified, diagram format. One of ordinary skill will be able to select and assemble a system according to the invention from FIG. 1 and the accompanying description herein.

System 100 comprises an ionization chamber 102 for ionizing a gaseous mixture. The ionization chamber comprises a generally sealed enclosure 104 having at least three gas ports: entry port 116, exhaust port 118, and exhaust port 120. Enclosure 104 may be made of any suitable non-conductive material. Chamber 102 further comprises two electrodes 110, 112 (e.g., an anode and a cathode) spaced apart and insulated from one another. The electrodes are separated from each other by an enclosed volume 106. Entry port 116 is configured for discharging a gaseous mixture for ionization directly into the volume 106 between electrodes 110, 112. Entry port 116 may be connected in series with an adjustment valve 122. Valve 122 may be used to throttle gas flow into the ionization chamber, thereby providing for regulation of gas pressure within volume 106.

In an embodiment of the invention, a source 108 of ionizing radiation may be used to ionize gas within the volume 106. For example, an ultraviolet lamp may be installed inside of volume 106. Other types of radiation, such as X-rays or alpha particles, may also be employed. In the alternative, source 108 may be omitted entirely, and ionization may be driven entirely by an electric field that is created between electrodes 110 and 112. It may be desirable to increase the strength of the electric field if no source of ionizing radiation is used. Conversely, use of a radiation source may permit lower electrode voltages to be used, all other things being equal. Selection and/or omission of a radiation source 108 will depend on the composition of the gas mixture to be processed, the desired gaseous constituent to be separated, the gas pressure, electric field, and perhaps other variables. The ionization chamber should be configured to ionize the gaseous mixture in such a way that ions of a gas constituent to be separated are predominately of a first polarity, and other species present in the mixture are predominately neutral (i.e., not ionized), or predominately ions of an opposite polarity. For example, for separation of air into oxygen and nitrogen, conditions within volume 106 of the ionization chamber 102 may be configured to produce negative ions predominately comprised of $O_2^-$, and positive ions predominately comprised of $N_2^+$.

In general, ionization of gas mixtures is a complex phenomena that has been thoroughly studied for different applications. The same apparatus may yield different results, depending on how process parameters such as gas pressure, electric field, and gas chemistry are controlled. It is not the object of the invention to define particular process parameters or particular apparatus for achieving a given result. It is noted, however, that for the separation of oxygen from air, $O_2^-$ ions may be produced by "quiet and dark" ionization that occurs at relatively low ratios of electric field strength to gas pressure, such as known in the art of air ionization for air conditioning applications. At relatively high ratios of electric field strength to gas pressure, positive oxygen ions may be produced as well as other forms such as atomic oxygen or ozone, which may be undesirable.

Electrodes 110, 112 may be configured in various ways. In an embodiment of the invention, the electrodes are conductive plates. For example, the electrodes may be aluminum or copper plates. The electrode plates are oriented parallel to one another, and are mounted within enclosure 104 so as to divide the enclosure into a central enclosed volume 106 between the electrodes and two exhaust plenums 124, 126, as shown in FIG. 1. A plurality of openings 132, 134 are provided through electrodes 110, 112, respectively. The openings 132, 134 provide for fluid communication between the exhaust plenums 124, 126 and the volume 106 between the electrodes. For example, the openings may be holes or slots through a sheet metal electrode, or the interstices of a wire mesh electrode. Openings 132, 134 may be conduits or channels, if desired. Passage of gaseous constituents through the electrode 110 and/or electrode 112 may be assisted by the phenomena of ion wind, particularly if openings 132, 134 are relatively large.

Electrodes 110, 112 should be spaced apart far enough so that gas adjacent to one electrode, e.g., electrode 110, is not likely to be suctioned into the exhaust plenum belonging to the opposite electrode, e.g., plenum 126 of electrode 112. At the same time, the electrodes should not be spaced too far apart, as this will weaken the electric field and make separation of ions less likely. In other words, in selecting an appropriate spacing and configuration of the electrode, the fluid dynamics created by pump suction should be considered as well as the electric field between the electrodes.

Pumps 128, 130 are connected to exhaust ports 118, 120, and may be operated to create suction in exhaust plenums 124, 126, respectively. Any suitable vacuum or suction pump may be used, depending on the intended mass flow rate through the system, the desired vacuum pressure in chamber 102, and the electric field voltage. The flow of gas into and out of system 100 is controlled by intake valve 122 and the operation of pumps 128, 130 and indicated by arrows 136, 138, and 140. A gaseous mixture is drawn into the ionization chamber 102 as shown by arrow 136, because of suction provided by pumps 128 and 130. Gas pressure within volume 106 may be controlled by adjusting valve 122. Gas within the volume 106 is ionized, and ions of opposite polarity tend to propagate in opposite directions, towards an oppositely-charged one of electrodes 110, 112. A portion of the gas passes through electrode 110, and is discharged through exhaust port 118, as indicated by arrow 138. The balance of gas flow passes through electrode 112 and is discharged through exhaust port 120, as indicated by arrow 140. Provided that chamber 102 is substantially sealed except for the gas ports, the inlet mass flow rate 136 will equal the sum of the exhaust flows 138, 140.

An electric field of static polarity is maintained between electrodes 110, 112 by DC power source 114. Any suitable source of direct current (DC) power may be used, such as a discrete power supply. Power source 114 should be capable of maintaining the desired electrode voltage across the electrodes at a sustained power level. Fairly substantial power may be required to support sustained gas separation mass flows, as the mass flow rate of separated gas should be directly related to the electric current passing between electrodes 110, 112. In an exemplary system for automotive use, power source 114 may comprise a connection to an automotive DC power system, an inverter to convert low voltage direct current to nominally 110 V alternating current, a transformer to step up 110 VAC to at least about 220 VAC, or higher, and a rectifier/filter to convert 220 VAC to stable direct current at a nominal voltage of about 200 VDC, or higher. Meanwhile, the power source 114 may be tapped at 110 or 220 VAC to power pumps 128, 130. For stationary or other application where high-voltage alternating current is available, the power source may simply comprise a rectifier/filter connected to the alternating current source.

For a given configuration of electrodes and voltage supplied to the electrodes, the voltage of the electric field may be related to the mass flow of gas through the ionization chamber. Using an apparatus of the type shown in FIG. 1 open to an ambient air environment, a voltage difference between the electrodes may decrease from an initial voltage measured when the ionization chamber is at atmospheric pressure. As gas is pumped out from the chamber and the input valve is restricted, pressure in the chamber will be reduced. Surprisingly, the voltage difference between the electrodes will decrease as the exhaust pump speed is increased, until a certain vacuum level is obtained in the ionization chamber. That is, the maximum voltage drop is a function of the pump speed and input flow rate. As the input valve is increasingly restricted, the maximum voltage drop will be observed at progressively slower pump speeds. The extent of voltage drop will depend on the characteristics of the voltage source, and is believed related to an electric current created by ionized gas flow between the electrodes. At pressures below the vacuum level at which a maximum voltage drop is observed, the voltage difference will again increase as the mass flow of gas between the electrodes decreases. Also, if the experiments are repeated with an ultra-violet radiation source in the ionization chamber, the observed voltage drop will be greater than observed under the same conditions without a radiation source.

It can further be demonstrated that the observed voltage drops are not merely a function of pressure within the ionization chamber. Surprisingly, in a system open to ambient air, the observed voltage drop depends on the relative speed of the two exhaust pumps. In particular, the outflow through the exhaust pump associated with the negative electrode has a greater effect than the outflow through the pump associated with the positive electrode. That is, for a given total exhaust pump speed and input valve setting, a greater voltage drop is observed when the exhaust pump associated with the negative electrode is operated at a higher speed than the pump associated with the positive electrode. These results are believed consistent with production of positive nitrogen ions and negative oxygen ions in an ambient air environment.

Figure 2:
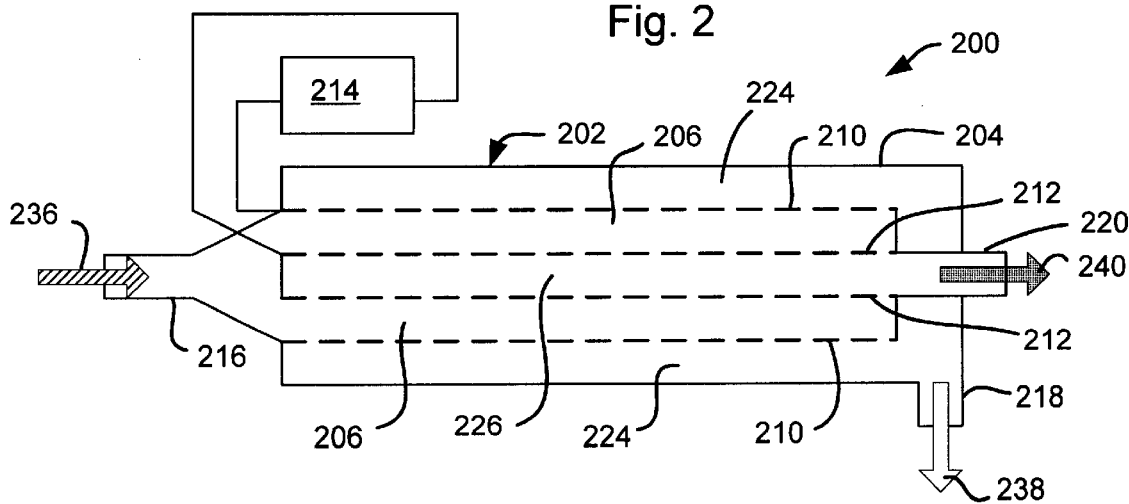
FIG. 2 is a diagram showing an exemplary system for gas separation, according to an alternative embodiment of the invention.

In an alternative embodiment, one or more exhaust plenums may be essentially enclosed by an electrode, such as in system 200, comprising an ionization chamber 202 with nested cylindrical electrodes 210, 212, as shown in FIG. 2. Such a configuration may make more efficient use of available space. Electrode 212 is in the form of a hollow cylinder, nested inside the opposite electrode 210, also a hollow cylinder. Electrodes 210, 212 are enclosed in an enclosure 204 and connected to a DC power source 214, similarly to system 100. An input gas mixture may be introduced into a volume 206 disposed between electrodes 210, 212 through entry port 216, as indicated by arrow 236. An electric field may be maintained across volume 206 by electrodes 210, 212. Exhaust plenum 226 is surrounded by the interior surfaces of electrode 212. Gas in plenum 226 may be exhausted by applying suction at exhaust port 220, with the flow of exhaust gas as indicated by arrow 240. A second exhaust plenum 224 is bounded by an outer surface of electrode 210 and the walls of enclosure 204. Gas in plenum 224 may be exhausted by applying suction at exhaust port 218, with the flow of exhaust gas as indicated by arrow 238. Other details of system 200 may be as previously described for system 100. It should be apparent that numerous other configurations for a system according to the invention are possible, consistent with the examples presented herein.

Figure 3:
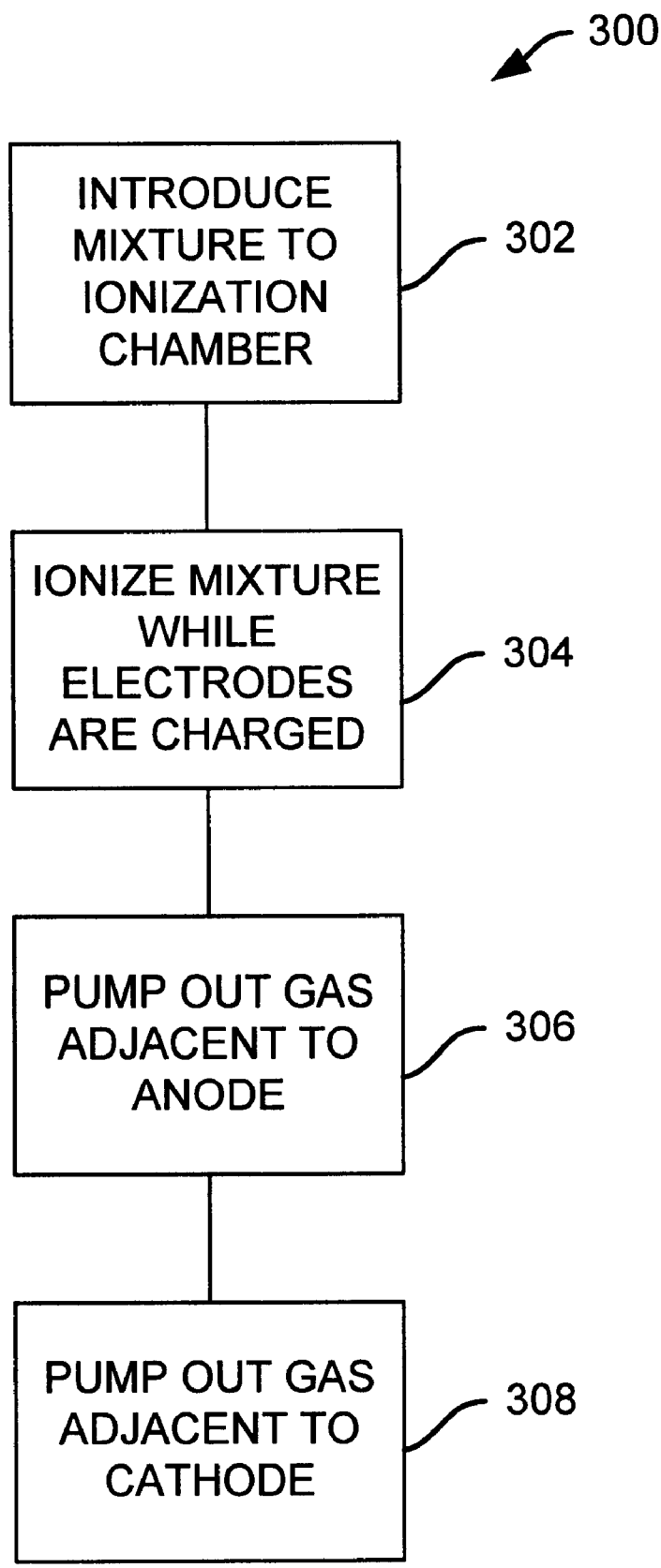
FIG. 3 is a flow diagram showing exemplary steps of a method for gas separation according to the invention.

Referring to FIG. 3, exemplary steps of a method 300 for separating a gas are diagrammed. Method 300 may be performed using any of the systems disclosed herein, or any other suitable equipment. Steps 302–308 are performed continuously and concurrently as a continuous method. At step 302, a gaseous mixture is introduced through an entry port into an enclosed ionization chamber. Optionally, the pressure of the mixture is reduced and regulated by a throttle valve in-line with the entry port. The ionization chamber comprises oppositely-charged electrodes of static polarity separated by a volume for containing the gaseous mixture. One of the electrodes is a cathode and the other is an anode.

At step 304, gas between the anode and cathode is ionized. Ionization may be driven by an electric field between the anode and cathode, by a separate radiation source, or by some combination of radiation and an electric field. As a result of the ionization, a constituent of the gas mixture is attracted towards one of the anode or the cathode. The balance of the mixture is attracted to the opposite electrode, or is unaffected by the electric field.

At step 306, gas adjacent to the anode is pumped out and discharged from the ionization chamber. This may be performed by applying suction to an exhaust plenum disposed against the anode, using any suitable pump. Similarly, at step 308, gas adjacent to the cathode is pumped out and discharged from the ionization chamber. Again, an exhaust plenum disposed against the cathode and suctioned by a suitable pump may be used to carry out this step. Gas pumped from the cathode is pumped in a separate gas stream segregated from gas pumped from the anode. Mass flow of gas into the ionization chamber should be equal to the sum of mass flows pumped from the anode and cathode. Under proper conditions, gas adjacent to at least one of the cathode or the anode will be enriched with respect to at least one gaseous constituent. Hence, at least one of the exhaust streams pumped from the anode or cathode will be enriched with respect to a gaseous constituent.

Having thus described a preferred embodiment of a method and system for gas separation, it should be apparent to those skilled in the art that certain advantages of the within system have been achieved. It should also be appreciated that various modifications, adaptations, and alternative embodiments thereof may be made within the scope and spirit of the present invention. For example, an open system for separation of oxygen and nitrogen from air, and method for using the system, have been illustrated, but it should be apparent that the inventive concepts described above would be equally applicable to separation of other gaseous constituents from other mixtures. For further example, it should be apparent that a system according to the invention may be used in connection with various different applications, including but not limited to combustion processes such as internal combustion engines, air conditioning, industrial processes and fire suppression. The invention is further defined by the following claims.

What is claimed is:

1. A system for separating a gaseous constituent from a gaseous mixture, comprising:
    an ionization chamber having an entry port for discharging the gaseous mixture into a substantially enclosed volume, the volume disposed between an anode and a cathode;
    first suction means disposed against the anode, for suctioning the gaseous mixture from the substantially enclosed volume through the anode, the first suction means configured to pump at a first suction rate;
    second suction means disposed against the cathode, for suctioning the gaseous mixture from the substantially enclosed volume through the cathode, the second suction means configured to pump at a second suction rate; and
    an adjustable throttle valve located upstream and in series with the entry port and configured to control flow into the ionization chamber at an inlet rate not greater than a sum of the first suction rate and the second suction rate, whereby the ionization chamber is maintained at a static pressure substantially less than atmospheric when the first suction means and the second suction means are operating.

2. A system of claim 1, further comprising a source of direct current connected to the anode and the cathode.

3. A system for separating a gaseous constituent from a gaseous mixture, comprising:
    an ionization chamber having an entry port for discharging the gaseous mixture at a rate controlled by an adjustable throttle valve into a substantially enclosed volume, the volume disposed between an anode and a cathode, said throttle valve located upstream and in series with respect to the entry port;
    a first suction plenum separated from the enclosed volume by the cathode, in fluid communication with the enclosed volume and evacuated by a first vacuum pump; and
    a second suction plenum separated from the enclosed volume by the anode and evacuated by a second vacuum pump, in fluid communication with the enclosed volume, whereby pressure within the ionization chamber is maintained at a low vacuum pressure when the first vacuum pump and the second vacuum pump are operating.

4. The system of claim 3, further comprising a source of ionizing radiation positioned to radiate the ionization chamber.

5. The system of claim 3, further comprising a first plurality of passages through the cathode, for providing fluid communication between the enclosed volume and the first suction plenum.

6. The system of claim 5, further comprising a second plurality of passages through the cathode, for providing fluid communication between the enclosed volume and the first suction plenum.

7. The system of claim 3, further comprising a source of ultraviolet radiation positioned to radiate the ionization chamber.

8. The system of claim 3, wherein the low vacuum pressure is a pressure not less than one torr.

9. The system of claim 3, wherein the low vacuum pressure is a pressure substantially less than atmospheric.

10. The system of claim 3, wherein an enriched mixture having a greater concentration of oxygen than in the ambient air is pumped through the first vacuum pump when the first vacuum pump is operating.

11. The system of claim 3, wherein an enriched mixture having a greater concentration of nitrogen than in the ambient air is pumped through the second vacuum pump when the second vacuum pump is operating.

12. The system of claim 3, further comprising a source of direct current connected to the anode and the cathode.

13. The system of claim 3, wherein the anode further comprises a plurality of openings providing fluid communication with the second suction plenum.

14. The system of claim 3, wherein the cathode further comprises a plurality of openings providing fluid communication with the first suction plenum.

15. The system of claim 3, wherein the anode comprises a conductive plate spaced apart from and parallel to the cathode, and wherein the cathode comprises a conductive plate.

16. The system of claim 3, wherein the anode and the cathode together comprise nested cylindrical sheets.

17. The system of claim 3, wherein the entry port is open to an ambient environment comprising air at about one atmosphere.

* * * * *